United States Patent
Sasaki et al.

(10) Patent No.: US 12,140,265 B2
(45) Date of Patent: Nov. 12, 2024

(54) SEAMLESS PIPE AND METHOD FOR MANUFACTURING SAME

(71) Applicant: JFE Steel Corporation, Tokyo (JP)

(72) Inventors: Shunsuke Sasaki, Tokyo (JP); Masao Yuga, Tokyo (JP); Tatsuro Katsumura, Tokyo (JP); Hideo Kijima, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 322 days.

(21) Appl. No.: 17/800,963

(22) PCT Filed: Jan. 18, 2021

(86) PCT No.: PCT/JP2021/001455
§ 371 (c)(1),
(2) Date: Aug. 19, 2022

(87) PCT Pub. No.: WO2021/171826
PCT Pub. Date: Sep. 2, 2021

(65) Prior Publication Data
US 2023/0079996 A1    Mar. 16, 2023

(30) Foreign Application Priority Data
Feb. 26, 2020   (JP) .................................. 2020-030531

(51) Int. Cl.
*F16L 9/16*    (2006.01)
*B21B 19/06*    (2006.01)
*F16L 15/00*    (2006.01)

(52) U.S. Cl.
CPC .............. *F16L 9/165* (2013.01); *B21B 19/06* (2013.01); *F16L 15/001* (2013.01)

(58) Field of Classification Search
CPC ..................................................... F16L 9/165
(Continued)

(56) References Cited

U.S. PATENT DOCUMENTS 1,960,557 A * 5/1934 Snyder .................. F16L 43/001
138/155
4,218,814 A * 8/1980 Hodapp .............. B29C 66/4322
138/167
(Continued)

FOREIGN PATENT DOCUMENTS

EP    2690188 A1    1/2014
JP    56168903 A    12/1981
(Continued)

OTHER PUBLICATIONS

Extended European Search Report for European Application No. 21760889.2, dated Sep. 6, 2023, 9 pages.
(Continued)

*Primary Examiner* — Patrick F Brinson
(74) *Attorney, Agent, or Firm* — Buchanan Ingersoll & Rooney PC

(57) ABSTRACT

The seamless pipe in which a thin-walled portion in a pipe circumferential direction is formed in a pipe axial direction, in which a line segment formed by connecting one end and the other end of the thin-walled portion along a pipe surface with a shortest distance in a formation direction of the thin-walled portion is inclined at an angle α of 5.0° or more with respect to the pipe axial direction. It is preferable that one end and the other end of the thin-walled portion are set from a region in a pipe selected with a shorter length between a length of 1.0 m in the pipe axial direction and 90% of a length in the pipe axial direction where the thin-walled portion turns once in the pipe circumferential direction.

20 Claims, 5 Drawing Sheets

(58) Field of Classification Search
USPC .................. 138/154, 177, 178, DIG. 11
See application file for complete search history.

(56) References Cited

U.S. PATENT DOCUMENTS

| | | | |
|---|---|---|---|
| 7,770,604 B2* | 8/2010 | Sjoberg | B29C 53/78 138/129 |
| 2017/0122468 A1 | 5/2017 | Sugino et al. | |
| 2018/0258709 A1 | 9/2018 | Yoneyama et al. | |

FOREIGN PATENT DOCUMENTS

| JP | 597425 A | 1/1984 |
|---|---|---|
| JP | 01031504 A | 2/1989 |
| JP | 07265910 A | 10/1995 |
| JP | 11057842 A | 3/1999 |
| JP | 2001009508 A | 1/2001 |
| JP | 2012167329 A | 9/2012 |
| JP | 5831195 B2 | 12/2015 |
| JP | 2017140652 A | 8/2017 |
| JP | 6596954 B2 | 10/2019 |
| WO | 2015182128 A1 | 12/2015 |
| WO | 2016113790 A1 | 7/2016 |

OTHER PUBLICATIONS

International Search Report and Written Opinion for International Application No. PCT/JP2021/001455, dated Feb. 16, 2021, 8 pages.
"Handbook of Iron and Steel", Table 11.29, 11.30, 11.31, 3 pages, 3rd edition, vol. III (2), Nov. 20, 1980.
"Handbook of Iron and Steel", 16 pages, 3rd edition, vol. III (2), Nov. 20, 1980.
Partial European Search Report for European Application No. 21760889.2, dated Jun. 5, 2023, 11 pages.

* cited by examiner

[FIG. 1]
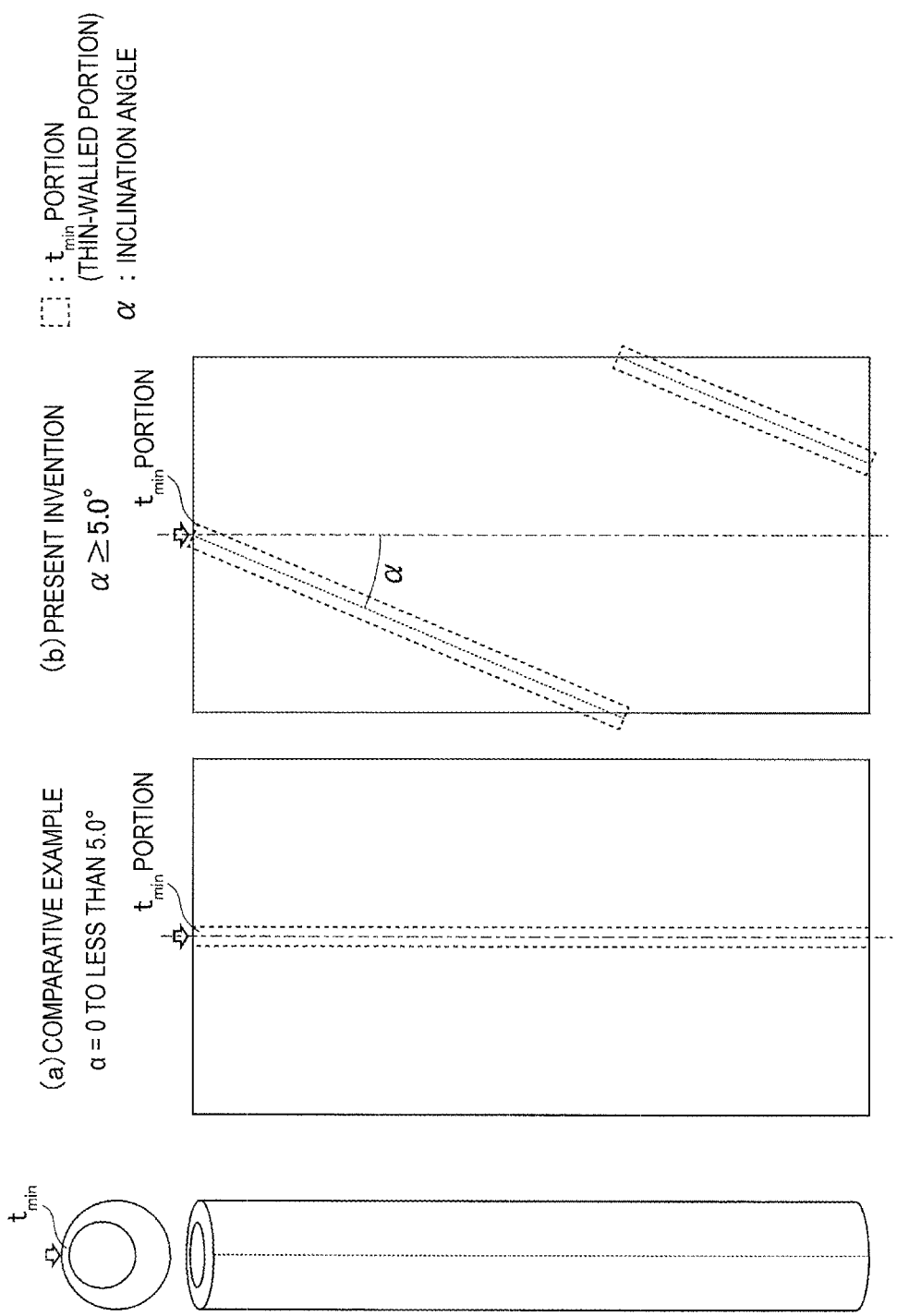

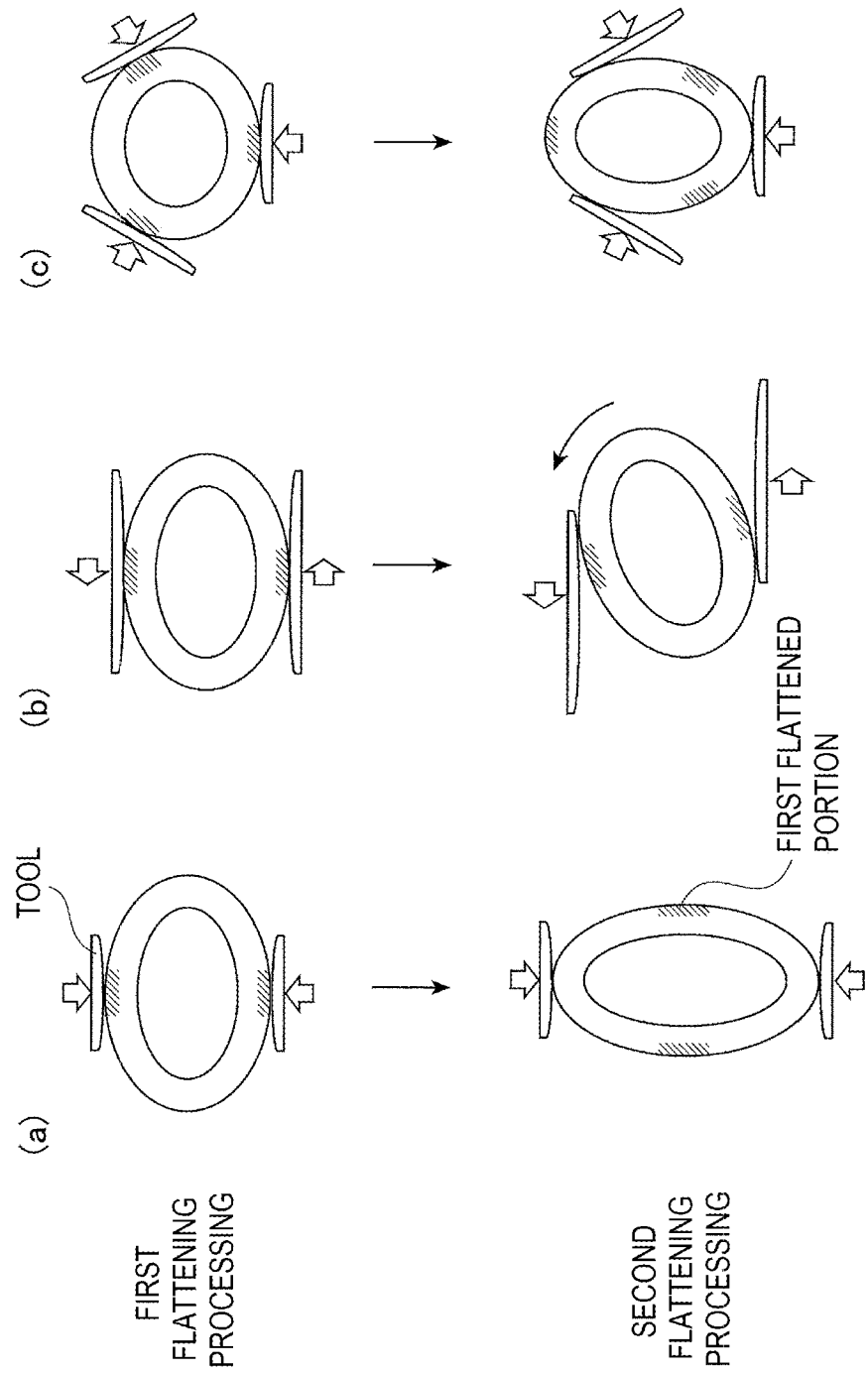

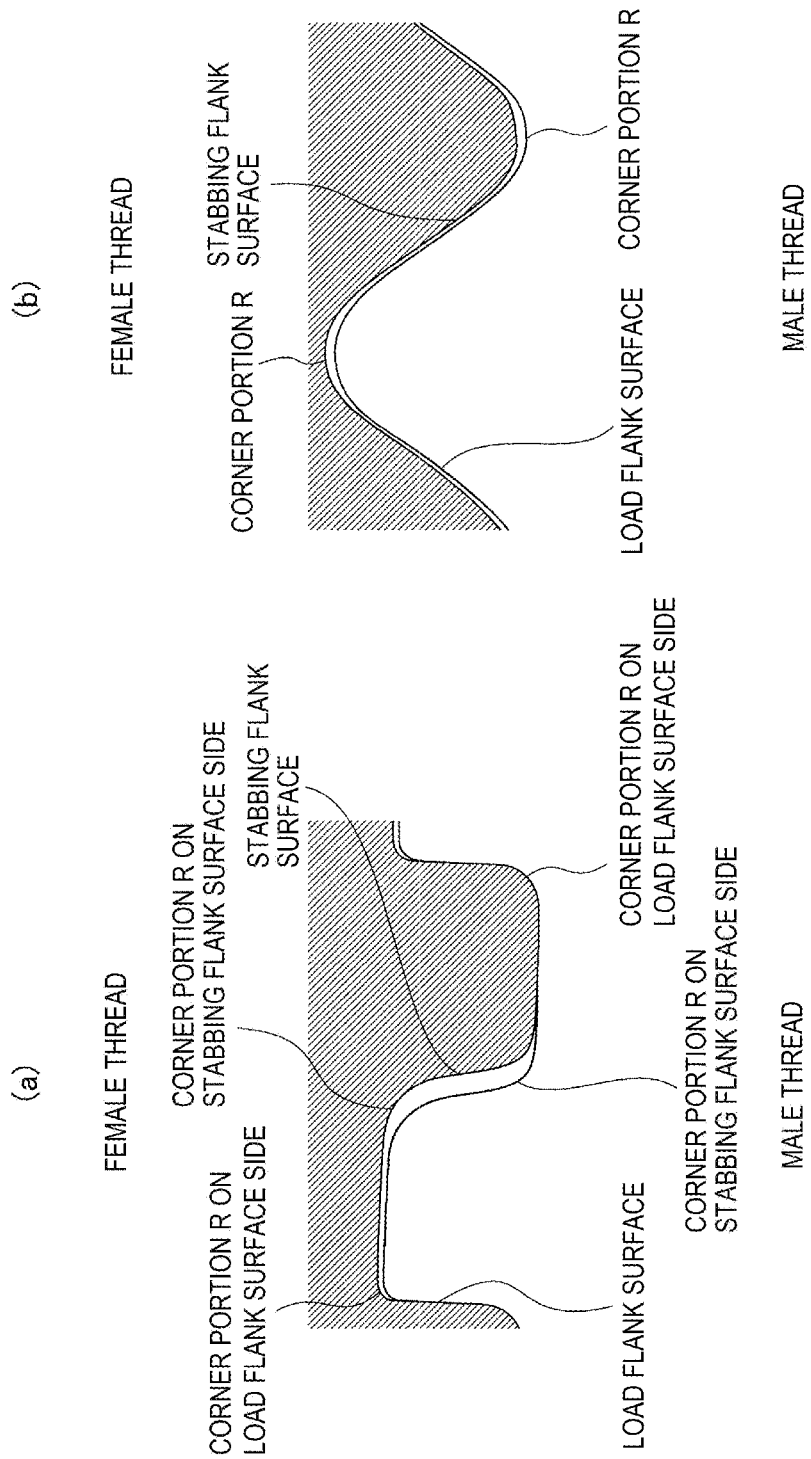
[FIG. 3]

[FIG. 4]
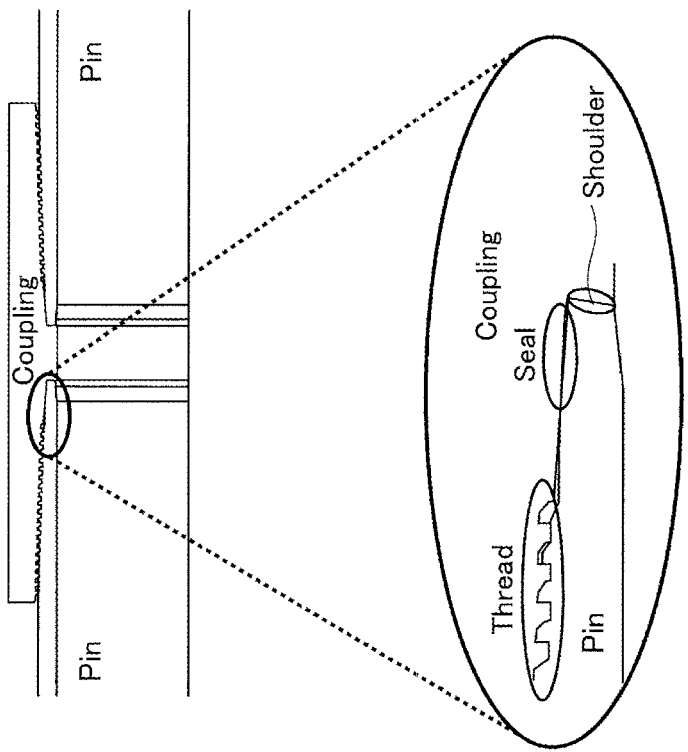
(b) PREMIUM JOINT
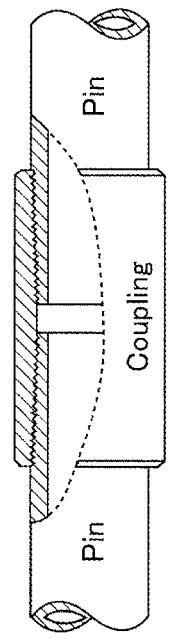
(a) API THREADED JOINT

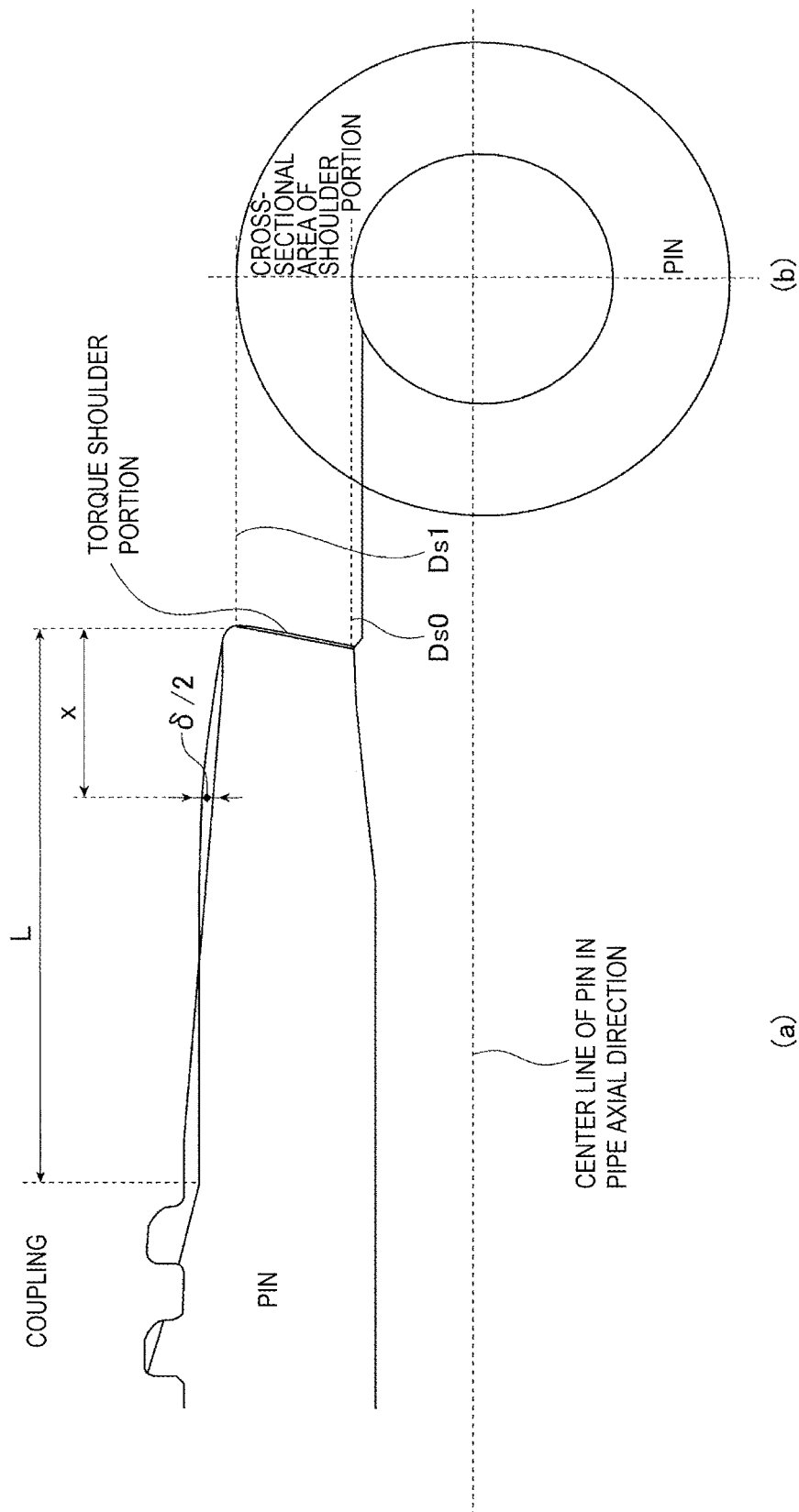
[FIG. 5]

SEAMLESS PIPE AND METHOD FOR MANUFACTURING SAME

CROSS REFERENCE TO RELATED APPLICATIONS

This is the U.S. National Phase application of PCT/JP2021/001455, filed Jan. 18, 2021, which claims priority to Japanese Patent Application No. 2020-030531, filed Feb. 26, 2020, the disclosures of these applications being incorporated herein by reference in their entireties for all purposes.

FIELD OF THE INVENTION

The present invention relates to a seamless pipe having excellent pressure resistance performance and a method for manufacturing the same.

BACKGROUND OF THE INVENTION

A seamless pipe used for connecting pressure vessels or for mining oil wells or gas wells is required to have a pressure resistance performance to withstand various temperature or pressure environments, in addition to mechanical properties such as strength and toughness, and a corrosion resistance performance to withstand a corrosive environment. There are various forms of pressure and external force applied to the seamless pipe, and for example, a large internal pressure may be often generated in a pressure vessel or the piping. In addition, in a case where the contents are high in temperature or the outside air temperature is high, the seamless pipe expands thermally, so that compressive stress in a pipe axial direction is generated between connecting portions at pipe ends. On the contrary, in a case where the contents are low in temperature or the outside air temperature is low, tensile stress is generated in the pipe axial direction due to thermal contraction. That is, in addition to the internal pressure, stress in the pipe axial direction is generated.

In addition, for example, a seamless pipe used for an oil well or a gas well is inserted into the ground or the sea by mining, and in that case, a high external pressure is generated in the seamless pipe. The external pressure increases as the depth increases, and at the same time, the temperature also rises and the material softens, so that plastic deformation due to the external pressure is likely to occur. In addition, since seamless pipes for resource mining are connected in series from the ground, high tensile stress due to their own weight is often applied together with external pressure. Furthermore, the seamless pipe may be bent in the traveling direction during mining, high compressive stress may be generated on the inside with a small bending radius of curvature, and high tensile stress may be generated on the outside with a large radius of curvature.

Since the seamless pipe has no seam in a pipe circumferential direction, the seamless pipe is often used even in such a harsh pressure and stress environment. Here, the fact that the seamless pipe is plastically deformed and broken due to pressure is referred to as a collapse. The collapse occurs in a case where the generated internal pressure and external pressure exceed the yield strength of the seamless pipe. In addition, when tensile stress and compressive stress in the pipe axial direction are generated at the same time as the external and internal pressure, the collapse is more likely to be generated. Furthermore, a decrease in the roundness of the seamless pipe and an increase in uneven thickness (non-uniformity of wall thickness) also make it easy for collapse to occur.

The collapse can be prevented by improving the yield strength of the material of the steel pipe and ensuring excellent pressure resistance performance. Therefore, a seamless steel pipe (PTL 1) is disclosed in which the yield strength in the circumferential direction and the pipe axial direction of the seamless pipe is increased. In addition, since the roundness and reduction of the uneven wall thickness of the seamless pipe is also effective in suppressing collapse, a method for manufacturing a seamless steel pipe for improving the roundness and the uneven wall thickness (PTL 2) is disclosed.

PATENT LITERATURE

[PTL 1] Japanese Patent No. 6596954
[PTL 2] Japanese Patent No. 5831195

SUMMARY OF THE INVENTION

In PTL 1 and PTL 2, in order to improve the pressure resistance performance, a method of increasing the strength of the seamless steel pipe and improving the dimensional accuracy is examined. It cannot be said however, that it is sufficient as a technique for ensuring excellent pressure resistance performance.

Aspects of the present invention have been made in view of the above circumstances, and an object thereof is to provide a seamless pipe having excellent pressure resistance performance and a method for manufacturing the same.

In order to improve the pressure resistance performance, it is effective to increase the yield strength of the seamless pipe in the pipe circumferential direction and the pipe axial direction so as to withstand the pressure and external force applied from various directions.

In addition, making the roundness as good as possible is effective in improving the pressure resistance performance, and the pressure resistance performance can be improved by optimizing the manufacturing conditions for sizing rolling, which can adjust the dimension of the seamless pipe, and straightening rolling.

On the other hand, it is known that when the uneven wall thickness is reduced, the pressure resistance performance is improved, and in a case where collapse is caused by the uneven wall thickness, a thin-walled portion due to the uneven wall thickness is the starting point of collapse, as an effect of the uneven wall thickness generated during the manufacture of the pipe on the pressure resistance performance.

In this regard, when the seamless pipe with no uneven wall thickness can be provided by various rolling processes with good productivity, products with high pressure resistance performance can be supplied, and in that application, the degree of freedom in design can be improved, the range of use can be expanded, and safety can be improved.

It is known that the uneven wall thickness is caused by various factors such as uneven heat of the pipe material during hot rolling, wear of the tool, change of friction, and deviation from the setting position of the equipment. Among the uneven wall thicknesses generated by these various factors, the uneven wall thickness generated in the process of piercing in the pipe material at the initial stage of hot rolling, for example, the uneven wall thickness generated by the Ugine-Sejournet method, the Erhardt push bench method, or the Mannesmann method, is difficult to correct in the subsequent downstream hot rolling steps and the subsequent cold rolling steps, and remains in the product.

However, in order to obtain high pressure resistance performance, although the yield strength and roundness described above can be adjusted by optimizing the chemical composition to be added and the sizing rolling conditions, it is inevitable that the uneven wall thickness occurs to some extent, and it is necessary to design the product in anticipation of uneven wall thickness in advance.

Therefore, it is necessary to limit the dimensions and use expensive additive elements while considering safety in anticipation of deterioration of pressure resistance performance due to the uneven wall thickness.

Although various studies have been conducted to eliminate the uneven wall thickness until now, since the causes of the uneven wall thickness vary and are complicated, there is no technique that can stably reduce the uneven wall thickness, and it can only be managed by regulating the maximum amount of uneven wall thickness.

As a result of diligent studies in view of the above problems, the present inventors found that the pressure resistance performance can be improved by controlling the distribution of the uneven wall thickness inevitably generated.

That is, until now, although it was mainly studied from the viewpoint of suppressing the occurrence of uneven wall thickness, the present inventors considered that the occurrence of uneven wall thickness was inevitable, and found that the pressure resistance performance can be improved by distributing the thin-walled portions generated by the uneven wall thickness in a specific spiral shape on the pipe axis as compared with a pipe in which the thin-walled portions were distributed in a shape close to a straight line in the pipe axial direction.

The gist structure according to aspects of the present invention, which was completed based on the above findings and further study, is as follows.

[1] A seamless pipe in which a thin-walled portion in a pipe circumferential direction is formed in a pipe axial direction, in which a line segment formed by connecting one end and the other end of the thin-walled portion along a pipe surface with a shortest distance in a formation direction of the thin-walled portion is inclined at an angle α of 5.0° or more with respect to the pipe axial direction.

[2] The seamless pipe according to the above [1], in which one end and the other end of the thin-walled portion are set from a region in a pipe selected with a shorter length between a length of 1.0 m in the pipe axial direction and 90% of a length in the pipe axial direction where the thin-walled portion turns once in the pipe circumferential direction.

[3] The seamless pipe according to the above [1] or [2], in which an average outer diameter $D_{ave}$ [mm] and the angle α [°] satisfy the following formula (1).

$$D_{ave}/\alpha=0.5 \text{ to } 15.0 \text{ [mm/°]} \quad \ldots \quad \text{Formula (1)}$$

[4] The seamless pipe according to any one of above [1] to [3], in which compressive yield strength [MPa] in the pipe axial direction/tensile yield strength [MPa] in the pipe axial direction is 0.85 or more.

[5] The seamless pipe according to any one of above [1] to [4], in which at least one of pipe end portions on both sides is provided with a fastening portion of a male thread or a female thread and a radius of curvature of a corner portion formed by a flank surface and a bottom surface of a thread valley of the fastening portion is 0.2 mm or more.

[6] The seamless pipe according to the above [5], in which at least one of the pipe end portions on both sides is provided with the fastening portion of the male thread or the female thread, and the fastening portion is provided with a metal-to-metal seal portion and a torque shoulder portion.

[7] A method for manufacturing a seamless pipe according to any one of above [1] to [6], the method including performing piercing of a pipe material by hot rolling, while rotating the pipe material and advancing the pipe material in a pipe axial direction; and performing bending and bending back processing in a pipe circumferential direction as cold processing on a pipe after the hot rolling, in which a pipe length LF [mm] after the hot rolling, a pipe length LP [mm] after the piercing rolling, and an amount of traveling X [mm] in a rolling direction of the pipe in one rotation of the pipe during the piercing rolling satisfy the following formula (2).

$$(LF/LP) \times X \leq 1100 \text{ [mm]} \quad \text{Formula (2)}$$

According to aspects of the present invention, there is provided a seamless pipe having excellent pressure resistance performance and a method for manufacturing the same.

BRIEF DESCRIPTION OF THE DRAWINGS

FIG. 1 is a diagram for describing distribution of thin-walled portions generated by uneven wall thickness in a seamless pipe of each embodiment.

FIG. 2 is a diagram for describing bending and bending back processing in a pipe circumferential direction.

FIG. 3 is a cross-sectional view of a fastening portion of a male thread and a female thread in a pipe axial direction (cross-sectional views parallel to the pipe axial direction). FIG. 3(a) is in the case of a trapezoidal thread, and FIG. 3(b) is in the case of a triangular thread.

FIG. 4 is a cross-sectional view of a threaded joint in the pipe axial direction (cross-sectional views parallel to the pipe axial direction). FIG. 4(a) is in the case of an API threaded joint, and FIG. 4(b) is in the case of a premium joint.

FIG. 5 is a schematic view of a vicinity of a nose portion which is an extension portion of a pin. FIG. 5(a) is a cut sectional view of the pin and a coupling fastening portion parallel to the pipe axial direction, and FIG. 5(b) is a torque shoulder portion when a thread tip end portion of the pin is viewed from a front of a pin tip end portion.

DETAILED DESCRIPTION OF EMBODIMENTS OF THE INVENTION

First Embodiment

Hereinafter, a first embodiment of the present invention will be described with reference to the drawings.

The seamless pipe according to the present embodiment is a seamless pipe in which a thin-walled portion in the pipe circumferential direction is formed in the pipe axial direction, a line segment formed by connecting one end and the other end of the thin-walled portion along the pipe surface with the shortest distance in a formation direction of the thin-walled portion is inclined at an angle α of 5.0° or more (hereinafter, also referred to as an inclination angle α or an uneven wall thickness twist angle α) with respect to the pipe axial direction, and is excellent in pressure resistance performance.

The thin-walled portion of the seamless pipe according to the present embodiment is formed so as to circulate in the pipe axial direction, and has a spiral shape, for example.

Here, the thin-walled portion refers to a portion having the minimum wall thickness in the pipe circumferential direction formed by the uneven wall thickness (primary uneven wall thickness) generated by using inclined rolling for piercing rolling or cold processing. In addition, the pipe surface may be either an inner surface of the pipe or an outer surface of the pipe. In addition, the one end and the other end of the thin-walled portion refer to one end and the other end of the thin-walled portion in the region when a measurement region is randomly selected in the pipe axial direction.

The setting positions of one end and the other end are not particularly limited, and in order to further improve the accuracy of measurement of the angle α, it is preferable that one end and the other end of the thin-walled portion are set from a region in the pipe selected with the shorter length between (1) a length of 1.0 m in the pipe axial direction and (2) 90% of a length in the pipe axial direction where the thin-walled portion turns once in the pipe circumferential direction.

In a case where the condition (2) is selected as the selection of the region in the pipe, the length may not be 90% of the length in the pipe axial direction where the thin-walled portion turns once in the pipe circumferential direction, and may be, for example, 40% or less than 40%.

Inclination Angle α: 5.0° or More

FIG. 1 is a diagram for describing distribution of thin-walled portions generated by uneven wall thickness in the seamless pipe according to the present embodiment.

A $t_{min}$ portion in FIG. 1 can be measured by a non-destructive wall thickness distribution survey for seamless pipes at the time of production, and illustrates a thin-walled portion generated by the uneven wall thickness caused by piercing rolling. In the above non-destructive wall thickness distribution survey, a Fourier transform is performed after the non-destructive inspection.

In FIG. 1, FIGS. 1(a) and 1(b) are diagrams illustrating the distribution of the $t_{min}$ portion on the pipe axis by cutting and unfolding the seamless pipe in the pipe axial direction, respectively. FIG. 1(a) is a comparative example (example in the related art), and FIG. 1(b) is a development diagram according to the embodiment of the present invention. α is the uneven wall thickness twist angle in the pipe axial direction of the line segment formed by connecting one end and the other end of the thin-walled portion along the pipe surface with the shortest distance in the formation direction of the thin-walled portion. Preferably, α can be the inclination angle with respect to the pipe axial direction of the line segment formed by connecting the uneven wall thickness portion at one end and the uneven wall thickness portion at the other end with the shortest distance along the pipe surface in the formation direction of the thin-walled portion, in the pipe selected with the shorter length between the length of 1.0 m in the pipe axial direction and the length of 90% (preferably 40%) of the length in the pipe circumferential direction where the thin-walled portion turns once in the pipe circumferential direction.

Here, it is preferable that the inclination angle α is measured with a central portion in the length direction of the pipe as a center in the length direction of a measurement target region.

As a result of examining the relationship between the inclination angle α and the pressure resistance performance by using a plurality of seamless pipes in which uneven wall thickness is inevitably generated, and have the same amount of uneven wall thickness and different inclination angles α, the present inventors found that the pressure resistance performance is significantly improved when the inclination angle α is 5.0° or more.

In addition, it was confirmed that this superiority is exhibited even in a case where tensile stress, compressive stress, and bending stress are generated at the same time in addition to internal and external pressure. The inclination angle α is preferably 15° or more, and more preferably 25° or more, from the viewpoint of further improving the pressure resistance performance. In addition, since the inclination rolling efficiency may decrease when the angle is made too large, the inclination angle α is preferably 80° or less, and more preferably 60° or less.

Amount of Uneven Wall Thickness

The uneven wall thickness is inevitably generated in the seamless pipe manufactured by rolling including hot and cold. The amount of uneven wall thickness [%] is represented by the following formula (3) using the thickest portion of the entire pipe: maximum wall thickness $t_{max}$ [mm], the thinnest portion wall thickness: minimum wall thickness $t_{min}$ [mm], and the average value of the wall thickness distribution of the pipe: average wall thickness $t_{ave}$ [mm], in the wall thickness distribution in the pipe at the time of production generated by piercing rolling.

$$((t_{max}-t_{min})/t_{ave})\times100[\%] \quad \text{Formula (3)}$$

In the above formula (3), the average wall thickness $t_{ave}$ is obtained by measuring 32 points of wall thickness t at intervals of 11.25° in the pipe circumferential direction starting from the thin-walled portion in the central portion in the length direction of the pipe and calculating the average of these numbers. The thickness can be measured by a non-destructive test using ultrasonic waves or the like.

In the seamless pipe manufactured by rolling, the amount of uneven wall thickness of approximately 2 to 15% is inevitably generated depending on the product thickness. The uneven wall thickness is most likely to occur during piercing rolling. Since there are various causes of uneven wall thickness at that time, such as temperature unevenness of the material before piercing, friction coefficient of the tool, and backlash of equipment, the occurrence is inevitable, and product specifications that anticipate the occurrence of uneven wall thickness to some extent are required. In addition, those products with excessive uneven wall thickness cannot meet the pressure resistance performance and are discarded. Therefore, productivity may be reduced due to restrictions on manufacturing conditions, and product shape restrictions or chemical composition restrictions may occur in order to ensure pressure resistance performance. In this respect, in the pipe according to the present embodiment, the effect can be confirmed without an upper limit when the amount of uneven wall thickness is 2% or more for the inevitably generated uneven wall thickness. On the other hand, also in the present embodiment, when an excessively large uneven wall thickness is present, characteristics other than the pressure resistance performance may be adversely affected. Therefore, the amount of uneven wall thickness is preferably controlled to 20% or less. The amount of uneven wall thickness is more preferably 12% or less, and still more preferably 10% or less.

As described above, the wall thickness can be measured by various non-destructive testing. For example, the wall thickness distribution of the total length of the pipe can be measured by ultrasonic waves, and the above-described maximum wall thickness $t_{max}$, the minimum wall thickness $t_{min}$, and the average wall thickness $t_{ave}$ can be output.

In addition, only the uneven wall thickness distribution (distribution of the primary uneven wall thickness) can be extracted by performing frequency analysis with the Fourier transform on the wall thickness distribution of the total length of the pipe, and the inclination angle (uneven wall thickness twist angle) α of the central portion in the length direction of the pipe can be calculated. In accordance with aspects of the present invention, it is possible to control the pressure resistance performance by significantly controlling the inclination angle α measured in this manner.

Forms of Uneven wall Thickness ($D_{ave}/α=0.5$ to 15.0)

In the present embodiment, even in a case where an inevitable uneven wall thickness occurs on the pipe, the pressure resistance performance can be improved by controlling the uneven wall thickness, and various restrictions related to the above-described uneven wall thickness can be reduced.

Specifically, by setting the inclination angle α illustrated in FIG. 1 to 5.0° or more, for example, by taking a form in which the thin-walled portion is spirally distributed in the pipe axial direction of the seamless pipe, the rigidity in the pipe axial direction can be increased and the pressure resistance performance can be significantly improved, compared with the form in which the thin-walled portion is linearly distributed at less than 5.0°.

In addition, when the inclination angle α is controlled according to the outer diameter of the pipe, the effect is further enhanced. As a result of investigating various forms, it was confirmed by the present inventors that good pressure resistance performance can be obtained by controlling the inclination angle α [°] with the following formula (1) for the average outer diameter $D_{ave}$ [mm] of the seamless pipe.

$D_{ave}/α=0.5$ to 15.0 [mm/°] .... Formula (1) When $D_{ave}/α$ is 0.5 mm/° or more, good pressure resistance performance is obtained, and when $D_{ave}/α$ is less than 0.5 mm/°, the efficiency of inclined rolling may decrease.

In addition, when $D_{ave}/α$ is 15.0 mm/° or less, good pressure resistance performance is obtained, and when $D_{ave}/α$ exceeds 15.0 mm/°, the effect of improving the pressure resistance performance may be reduced.

As described above, it is preferable to set the inclination angle α to 5.0° or more and satisfy the above formula (1). More preferably, $D_{ave}/α$ is 3.0 mm/° or more, still more preferably 5.0 mm/° or more, and even more preferably 6.0 mm/° or more. In addition, more preferably, $D_{ave}/α$ is 12.0 mm/° or less, still more preferably 11.0 mm/° or less, and even more preferably 8.0 mm/° or less.

The average outer diameter $D_{ave}$ is obtained by measuring 9 points of the outer diameter D at intervals of 40° in the pipe circumferential direction starting from the thin-walled portion and calculating the number average of these 9 points. In addition, this average outer diameter $D_{ave}$ is measured at a position between the pipe end and the pipe axial direction 1/5 to (4×1)/5 with respect to the pipe length 1. In addition, it is possible to measure one position or a plurality of positions in that range to take the average of those measurements.

Compressive Yield Strength in Pipe Axial Direction [MPa]/Tensile Yield Strength in Pipe Axial Direction [MPa]: 0.85 or more In addition, in the seamless pipe according to the present embodiment, "compressive yield strength in pipe axial direction [MPa]/tensile yield strength in pipe axial direction [MPa]" is preferably 0.85 or more.

When the "compressive yield strength in pipe axial direction [MPa]/tensile yield strength in pipe axial direction [MPa]" is 0.85 or more, the pressure resistance performance is further increased.

In addition, although it is not necessary to set an upper limit for "compressive yield strength in pipe axial direction [MPa]/tensile yield strength in pipe axial direction [MPa]", when the compressive yield strength in the pipe axial direction is excessively large with respect to the tensile yield strength in the pipe axial direction, the orientation dependence is strong for other mechanical properties such as toughness, so that it is preferably 1.15 or less.

The compressive yield strength in the pipe axial direction can be measured by a cylinder compression test.

A cylindrical test piece to be compressed is collected from a center portion of the wall thickness parallel to the pipe axial direction. In addition, a cylinder outer diameter d [mm] and a cylinder height h [mm] may be set to h/d≤2.0.

Specifically, a test piece is cut out from the center portion of the wall thickness of the pipe with a cylinder outer diameter d=5.0 mm and a cylinder height h=8.0 mm. The compression test adopts a form in which a test piece is sandwiched between flat plates at room temperature (25° C.), a load is applied to the test piece, and the compressive yield strength is calculated using the stress-strain curve obtained when the test piece is compressed. The stress-strain curve is obtained by performing 30% compression at a compression speed of 1.0 mm/min with a compression tester.

In addition, the tensile yield strength in the pipe axial direction is obtained in accordance with JIS Z2241. First, as a test piece, a round bar tensile test piece having a parallel portion diameter of 5.0 mm is cut out from the center portion of the wall thickness of the pipe parallel to the pipe axial direction. A tensile test is performed at room temperature (25° C.) at a crosshead speed of 1.0 mm/min until fracture. The tensile yield strength is calculated using the stress-strain curve obtained thereby.

Method for Manufacturing Seamless Pipe (Control Method of Inclination Angle α)

Hot Rolling

A suitable method for manufacturing a seamless pipe for setting the inclination angle α to 5.0° or more will be described. As a result of diligent studies by the present inventors, the present inventors found that when an inclined rolling mill is used and the manufacturing conditions thereof are controlled, a seamless pipe satisfying the present embodiment can be obtained.

Specifically, there are several piercing rolling methods for manufacturing the seamless pipe, such as the Ugine-Sejournet method, the Erhardt push bench method, and the Mannesmann method.

Of these, in the present embodiment, the Ugine-Sejournet method and the Erhardt push bench method, which adopt a method of piercing and extruding a pipe material with a tool without rotating the pipe material, are not suitable, and the Mannesmann method using inclined rolling is suitable.

Regarding the uneven wall thickness inevitably generated as described above, in a case of piercing with a tool without rotating the pipe material as in the Ugine-Sejournet method and the Erhardt push bench method, the thin-walled portion is formed in a shape close to parallel to the pipe axial direction, and the inclination angle α is close to 0° (less than 5.0°). In addition, in the piercing method such as the Ugine-Sejournet method and the Erhardt push bench method, controlling the uneven wall thickness twist angle is not considered, and the control is impossible due to the mechanical structure of equipment.

On the other hand, in the Mannesmann method, the pipe material is rotated to perform piercing rolling. In addition, in the Mannesmann method, torsional deformation of the pipe occurs in the pipe axial direction. In the related art, in a case where piercing rolling is performed by the Mannesmann method, control is performed to change various rolling conditions in order to reduce the uneven wall thickness. In addition, although studies were made to suppress excessive strain in the torsional deformation of the pipe in the pipe axial direction, positively controlling the distribution of the amount of traveling in the pipe axial direction and the torsional deformation of the material per rotation was not considered. In this respect, in the present embodiment, the Mannesmann method is adopted, the torsional deformation and rotation of the pipe are controlled, and the inclination angle α is controlled to manufacture a seamless pipe having excellent pressure resistance performance.

In addition, in the method for manufacturing the seamless pipe in which the form of uneven wall thickness is controlled according to the present embodiment, it is preferable to perform control so as to satisfy the following formula (2) during rolling in the piercing rolling using the inclined rolling mill by the Mannesmann method.

$$(LF/LP) \times X \leq 1100 [mm] \qquad \text{Formula (2)}$$

In formula (2),
X [mm]: Amount of traveling of the pipe in the rolling direction when the pipe turns once during piercing rolling
LF [mm]: Pipe length after hot rolling
LP [mm]: Pipe length after piercing rolling Even in a case where the pipes having the same average wall thickness and outer diameter are manufactured, the amount of traveling X of the pipe in the rolling direction can be variously changed by adjusting the inclination angle of the rolling roll, the roll gap, and the amount of protrusion of the plug for rolling the inner surface. Specifically, for example, when the inclination angle of the rolling roll is increased, the component force in the traveling direction increases, and the pipe material advances at a small number of rotations. Therefore, the amount of traveling X of the pipe in the rolling direction increases.

In addition, although the average wall thickness of the pipe is controlled by the balance between the roll gap and the amount of protrusion of the plug, the combination varies even in a case where the pipes having the same average wall thickness are obtained, and the amount of traveling X of the pipe in the rolling direction can be controlled by the combination. Specifically, for example, although the same wall thickness can be obtained between the case where the roll gap is reduced without protruding the plug and the case where the roll gap is increased by protruding the plug, when the plug is protruded, the amount of traveling X in the rolling direction can be further reduced due to the resistance of the plug.

In the present embodiment, piercing rolling is performed in the hot rolling step. LP is the pipe length after this piercing rolling.

In addition, after piercing rolling, hot rolling is completed through treatments such as wall thinning (hot wall thinning rolling) and sizing rolling. LF is the pipe length after hot rolling.

When hot rolling is performed in the present embodiment, values estimated in advance based on piercing rolling conditions and other hot rolling conditions are used as LF, LP, and X.

By setting "(LF/LP)×X" based on these values to 1100 mm or less, the inclination angle α of the finally obtained pipe can be set to 5.0° or more.

In addition, LF and X are measured after piercing rolling, LP is measured after hot rolling, and data is accumulated for the production of the next pipe together with rolling conditions during piercing rolling and other rolling conditions during hot rolling.

Specifically, first, the above adjustment of X [mm] can be predicted from the rolling rolls and guide openings for adjusting the outer diameter and the outer peripheral length of the raw pipe after piercing rolling. In addition, the maximum peripheral speed of the rolling roll can be obtained from the outer diameter and the number of rotations of the rolling roll. That is, the pipe rotation speed [rotation/s] during piercing rolling can be obtained by (roll peripheral speed [mm/s]/outer peripheral length [mm]) × rolling efficiency.

In addition, the traveling speed [mm/s] of the pipe during piercing rolling is obtained by TAN (rolling roll inclination angle [°]×π/180)×roll peripheral speed [mm/s]×rolling efficiency.

The rolling efficiency is determined by the strength of the rolling mill and the pipe material, and is approximately 0.4 to 0.8.

As described above, since the information on the pipe rotation speed, the traveling speed of the pipe, and the strength of the rolling mill and the pipe material is obtained before the piercing rolling, the amount of traveling X of the pipe in the rolling direction can be predicted before rolling. For materials for which the rolling efficiency is unknown, the rolling efficiency can be predicted in the range of 0.5 to 0.7, and the actual piercing rolling time and rolling efficiency can be used from the next time onward.

The above adjustment of LF [mm] and LP [mm] can be predicted from the volume of the pipe material before the start of rolling, the target pipe outer diameter after each rolling, and the pipe wall thickness. That is, in plastic working, the volume does not change before and after the deformation. Therefore, the length can be predicted by dividing the known initial volume before the start of rolling by the area of the cross section obtained from the target pipe outer diameter and the pipe wall thickness determined by the setting conditions of the rolling mill. In hot plastic working, although scale loss, thermal expansion, and thermal contraction cause slight volume changes, LF and LP do not change substantially.

In addition, after various hot rolling processes, it is possible to further perform wall thinning or outer diameter rolling in the cold rolling processes.

For the hot wall thinning rolling, for example, a wall thinning rolling method such as an elongator, an Assel mill, a mandrel rolling, a plug mill rolling, or a hot Pilger rolling can be used. In addition, for sizing rolling, a sizer, a reducer, a straightening machine and the like can be used. For cold processing, drawing, cold pilger rolling, and bending and bending back processing can be used.

Since LF and LP are pipe lengths after rolling, LF and LP can be easily measured, and LF/LP of this value indicates how much the thin-walled portion such as the built-in spiral shape is stretched in the pipe axial direction.

The smaller "(LF/LP)×X" is, the larger the inclination angle α is and the higher the pressure resistance performance is. By setting "(LF/LP)×X" to 1100 mm or less and performing bending and bending back processing described later, the inclination angle α can be set to 5.0° or more. Therefore, "(LF/LP)×X" is preferably 1100 mm or less. In addition, for "(LF/LP)×X", 1000 mm or less is a more preferable range, and 800 mm or less is an even more preferable range. On the other hand, when "(LF/LP)×X" is too small, the amount of traveling X of the pipe in the rolling direction per rotation of the pipe during piercing rolling is reduced, so that the productivity deteriorates. Therefore, "(LF/LP)×X" is preferably 100 mm or more.

Cold Rolling

Bending and Bending Back Processing in Pipe Circumferential Direction

In particular, in the seamless pipe that requires strength, cold rolling is often performed after hot rolling.

In particular, in pipes for oil wells, cold drawing rolling and cold Pilger rolling are standardized as cold rolling for obtaining strength, and cold rolling is performed by any of these methods. Any of these methods are processing methods in which a tool for inner surface rolling is inserted into the inner surface of the pipe and the pipe is stretched in the axial direction.

However, when pipes are manufactured by these processing methods, uneven wall thickness is inevitably generated due to uneven friction coefficient and backlash of the apparatus, similar to the piercing rolling in hot rolling. In these processing methods, since the pipe is stretched in the axial direction, the uneven wall thickness distribution is likely to be close to parallel to the pipe axial direction in the final product, and as a result, the pressure resistance performance is lowered.

Furthermore, when hot piercing rolling is combined with a linear uneven wall thickness distribution method such as the Ugine-Sejournet method or the Erhardt push bench method and the above processing method, the uneven wall thickness is promoted, the amount of uneven wall thickness is increased, and the pressure resistance performance is further lowered. In addition, in these processing methods, since the pipe is strengthened by stretching in the pipe axial direction, it is known that the compressive yield strength in the pipe axial direction is reduced by 20 to 25% due to the Bauschinger effect. In addition to the external and internal pressure at the time of production, the possibility of collapse in an environment subject to compressive stress in the pipe axial direction increases.

On the other hand, in view of the above problems, the present inventors diligently studied a cold rolling method that does not reduce the compressive yield strength in the pipe axial direction, while maintaining the distribution pattern of uneven wall thickness with excellent pressure resistance performance obtained after hot rolling. As a result, the present inventors conceived a cold processing method by bending and bending back processing in the pipe circumferential direction. By using this bending and bending back processing, excellent pressure resistance performance can be obtained. This cold processing method will be described with reference to FIG. 2.

FIG. 2 is a diagram for describing bending and bending back processing in the pipe circumferential direction. In the present embodiment, as described below, the yield strength of the pipe is increased while maintaining the distribution pattern of the uneven wall thickness by bending and bending back processing in the pipe circumferential direction. In this method, unlike cold drawing rolling and cold Pilger rolling, in which strain due to rolling occurs in the pipe axial direction (longitudinal pipe axial direction), as illustrated in FIG. 2, the strain is applied by bending processing due to flattening the pipe (first flattening processing) and then bending back processing when returning to a perfect circle (second flattening processing). In this method, the amount of strain is adjusted by using repeated bending and bending back and changes in the amount of bending, without significantly changing the initial pipe shape. That is, to increase the strength of the pipe by processing hardening using the cold processing method according to the present embodiment, the bending strain in the pipe circumferential direction is used, whereas the cold rolling method in the related art uses the elongation strain in the pipe axial direction, Since the control of the cold processing method and the strain in the pipe axial direction due to the control are suppressed, in principle, the Bauschinger effect in the pipe axial direction that occurs in the cold rolling method in the related art does not occur. Furthermore, since rolling is not performed from the inner surface of the pipe and the pipe is flattened by an external force from the outer surface of the pipe, the uneven wall thickness pattern formed by hot processing is not affected. Therefore, while maintaining the distribution of uneven wall thickness with excellent pressure resistance performance, the tensile yield strength and compressive yield strength in the pipe axial direction can be simultaneously increased, and the pressure resistance performance in an environment in which these external forces act in combination can be dramatically improved.

FIGS. 2(a) and 2(b) are cross-sectional views when the tool contact portions are set to two portions, and FIG. 2(c) is a cross-sectional view when the tool contact portions are set to three portions. In addition, the thick arrow in FIG. 2 indicates the direction where a force is applied when performing flattening processing of the pipe.

As illustrated in FIG. 2, when performing the second flattening processing, a method such as the tool is moved so as to rotate the pipe or the position of the tool is shifted may be devised, so that the tool comes into contact with a portion where the first flattening processing is not performed (shaded part in FIG. 2 indicates a first flattened portion).

As illustrated in FIG. 2, by applying bending and bending back processing in the pipe circumferential direction to flatten the pipe intermittently or continuously in the entire pipe circumferential direction, strain due to bending is applied near the maximum value of the curvature of the pipe, and strain due to bending back is applied toward the minimum value of the curvature of the pipe. As a result, strain due to bending and bending back deformation required for improving the strength of the pipe (strengthening dislocations) is accumulated. In addition, in a case where this processing form is used, unlike the processing form in which the wall thickness and outer diameter of the pipe are compressed, since a large amount of power is not required and the deformation is due to flattening, processing can be performed while minimizing the shape change before and after processing.

Regarding the tool shape used for flattening the pipe as illustrated in FIG. 2, rolls may be used, and when the pipe is flattened and rotated between two or more rolls disposed in the pipe circumferential direction, it is possible to easily apply strain due to repeated bending and bending back deformation.

Furthermore, when the rotation axis of the roll is inclined within 90° with respect to the rotation axis of the pipe, the pipe travels in the direction of the rotation axis of the pipe while undergoing flattening processing, so that the processing can be easily continued. In addition, in the continuous processing using this roll, for example, when the roll gap is appropriately changed so as to change the flatness amount with respect to the traveling of the pipe, the curvature (flatness amount) of the first and second pipes can be easily changed. Therefore, by changing the roll gap, the movement path of the neutral line can be changed to homogenize the strain in the wall thickness direction. In addition, similarly, the same effect can be obtained by changing the flatness amount by changing the roll diameter instead of the roll gap. In addition, these may be combined. Although it is complicated in terms of equipment, when the number of rolls is three or more, the runout of the pipe during processing can be suppressed, and stable processing can be performed.

The formula: $(LF/LP) \times X \leq 1100$ is satisfied by hot piercing rolling, and the cold processing is performed by bending and bending back processing as described above. Therefore, the inclination angle α can be set to 5.0° or more, and excellent pressure resistance performance can be obtained even in various pressure and stress environments.

The seamless pipe according to the present embodiment has the effect of improving the pressure resistance performance as compared with a pipe (pipe:α<5.0°) in which the distribution of the thin-walled portions due to the uneven wall thickness inevitably generated is close to parallel to the pipe axial direction regardless of the chemical composition and strength level of the pipe.

According to the method for manufacturing the seamless pipe according to the present embodiment, the uneven wall thickness distribution of the produced seamless pipe can be set to a: 5.0° or more regardless of the chemical composition and strength of the pipe material. The seamless pipe according to the present embodiment can be, for example, a carbon steel pipe, various stainless steel pipes, or a non-ferrous metal pipe.

In addition, in a case of being applied to a steel pipe for an oil well to which high external pressure and stress in the pipe axial direction are applied in a severe corrosive environment, as the seamless pipe according to the present embodiment, a sour-resistant steel pipe having a component composition containing C: 0.20 to 0.35%, Mn: 0.1 to 1.2%, Cr: 0.3 to 2.0%, and Mo: 0.1 to 1.5% in % by mass, and having the balance containing Fe and inevitable impurities such as S, P, Al, or O, having a martensite structure, having high strength, and having excellent sour resistance can also be used. In addition, duplex stainless steels (UNS S32205, S31260, S32750, S32760) having excellent corrosion resistance and having increased strength by the above-described bending and bending back processing can also be used. As the duplex stainless steel, a steel having a component composition containing Cr: 11.5 to 35.0% and Mo: 0.5 to 6.0% in % by mass, and having ferrite and austenite can be used. In addition, as the component composition of this duplex stainless steel, it is preferable to contain C: 0.08% or less, Si: 1.0% or less, Mn: 10.0% or less, Ni: 15.0% or less, and N: less than 0.400% in % by mass, and to have the balance containing Fe and inevitable impurities such as S, P, Al, or O, in addition to the above-described component composition, from the viewpoint of improving corrosion resistance. As the component composition of this duplex stainless steel, it is still more preferable to contain one or two selected from W: 6.0% or less and Cu: 4.0% or less in % by mass from the viewpoint of improving corrosion resistance. In addition, as the component composition of this duplex stainless steel, it is more preferable to contain one or two or more selected from Ti: 0.30% or less, Al: 0.30% or less, V: 1.0% or less, Nb: 1.0% or less in % by mass, from the viewpoint of improving the strength. In addition, as the component composition of this duplex stainless steel, it is preferable to contain one or two or more selected from B: 0.010% or less, Zr: 0.010% or less, Ca: 0.010% or less, Ta: 0.30% or less, Sb: 0.30% or less, Sn: 0.30% or less, REM: 0.010% or less, Ag: 0.30% in % by mass, from the viewpoint of improving workability during hot forming and improving corrosion resistance in an acidic atmosphere.

In addition, in a case of being exposed to a more severe corrosive environment during oil well mining, as the seamless pipe according to the present embodiment, Ni-based alloys (UNS N06600, N08800) can also be used. As the Ni-based alloy, it is preferable to contain Cr: 11.5 to 35.0%, Ni: 23.0 to 60.0%, and Mo: 0.5 to 17.0% in % by mass, to have a component composition in which the balance contains Fe and inevitable impurities such as S, P, Al, or O, and to have an austenite phase structure. In addition, as this Ni-based alloy, it is preferable to contain C: 0.05% or less, Si: 1.0% or less, Mn: 5.0% or less, and N: less than 0.400% in % by mass, from the viewpoint of improving corrosion resistance. In addition, as the Ni-based alloy, it is preferable to contain one or two selected from W: 5.5% or less and Cu: 4.0% or less in % by mass, from the viewpoint of improving corrosion resistance. In addition, as the Ni-based alloy, it is preferable to contain one or two or more selected from Ti: 1.5% or less, Al: 0.30% or less, V: 1.0% or less, and Nb: 1.0% or less in % by mass, from the viewpoint of improving strength. In addition, as the Ni-based alloy, it is preferable to contain one or two or more selected from B: 0.010% or less, Zr: 0.010% or less, Ca: 0.010% or less, Ta: 0.30% or less, Sb: 0.30% or less, Sn: 0.30% or less, and REM: 0.20% or less, from the viewpoint of improving workability during hot forming and improving corrosion resistance in an acidic atmosphere.

Second Embodiment

Next, a second embodiment of the present invention will be described.

The seamless pipe according to the present embodiment includes a fastening portion of a male thread or female thread on at least one of the pipe end portions on both sides with respect to the seamless pipe according to the first embodiment described above. The radius of curvature of a corner portion formed by a flank surface and a bottom surface of a thread valley of the fastening portion is 0.2 mm or more. Since the seamless pipe according to the present embodiment has the same other configuration and the function as the seamless pipe according to the first embodiment described above, only the fastening portion of the male thread and the female thread will be described below. The seamless pipe having excellent pressure resistance performance according to the present embodiment can be used for a threaded joint directly connected to another pipe (integral type) or a threaded joint connected via a coupling (T & C type).

Here, first, a thread provided at the pipe end portion will be described.

The pipe for an oil well, a gas well, or a geothermal well may be fastened with threads instead of welding to connect the pipes, from the viewpoint of fire prevention and repeated insertion or removal.

Seamless pipes used in oil wells and gas wells exposed to high external pressure and hot water mining applications are required to have a high tensile yield strength in the pipe axial direction, and the connecting portion of the pipe is also required to have a high compressive yield strength in the pipe axial direction.

The threaded joint includes a pin with a male thread and a box (coupling) with a female thread. Examples of the threaded joint include a standard threaded joint specified in the American Petroleum Institute (API) standard, and a high-performance special threaded joint having a metal-tometal seal portion and a torque shoulder portion as well as a thread portion and referred to as a premium joint.

In order to achieve a strong fastening of the thread, the thread can be designed so that a contact surface pressure is generated in the radial direction. For example, a tapered thread is used.

With the contact surface pressure in the radial direction, the pin (male thread side) is deformed in reduced diameter and extends in the pipe axial direction, and the box (female thread side) is deformed in expanded pipe diameter and contracts in the pipe axial direction, so that the contact surface pressure is generated on the flank surfaces at both ends of the thread.

Therefore, a compressive stress in the pipe axial direction is generated at thread threads according to the fastening force. Therefore, in the case of seamless pipes used in oil wells and gas wells exposed to high external pressure and hot water mining applications, in addition to high pressure resistance performance, the compressive yield strength in the pipe axial direction that can withstand compressive stress is often required. In particular, in the premium joint, since a large compressive stress in the pipe axial direction is generated in the torque shoulder portion, it is preferable to have a high compressive yield strength in the pipe axial direction.

In this respect, the seamless pipe according to the present embodiment includes the fastening portion of the male thread or the female thread on at least one of the pipe end portions on both sides, and further includes the configuration and the function of the seamless pipe according to the first embodiment described above.

As described above, when tightening at the fastening portion of the thread, the tension in the pipe axial direction and compressive stress are generated due to bending deformation after tightening.

In the present embodiment, since bending and bending back processing is performed by cold processing in order to improve the strength, the compressive yield strength in the pipe axial direction to the tensile yield strength in the pipe axial direction (compressive yield strength in the pipe axial direction [MPa]/tensile yield strength in the pipe axial direction [MPa]) can be 0.85 or more, and excellent threaded joint performance can be obtained in addition to high pressure resistance performance.

FIG. 3 is a cross-sectional view of the fastening portion of the male thread and the female thread in the pipe axial direction (cross-sectional views parallel to the pipe axial direction), and is a schematic view illustrating the position of the radius of curvature of the corner portion R at the fastening portion of the thread. FIG. 3(a) is a schematic view in the case of a trapezoidal thread, and FIG. 3(b) is a schematic view in the case of a triangular thread.

In a case where the seamless pipe according to the present embodiment is fastened with the thread, it is preferable that at least one of the pipe end portions on both sides is provided with the fastening portion of the male thread or the female thread and the radius of curvature of the corner portion formed by the flank surface and the bottom surface of the thread valley of the fastening portion is 0.2 mm or more.

That is, when the bending and bending back processing is used in the present embodiment, regardless of the type of thread, the male thread and the female thread come into contact with each other by fastening, and the radius of curvature of the corner portion R formed on the flank surface and the bottom surface of the thread valley where pressure is generated by fastening is set to 0.2 mm or more. Therefore, it is possible to improve the fatigue characteristics of the fastening portion of the thread. Regarding the flank surface, a thread slope on the side close to the pipe end of the male thread (pin) is referred to as a stabbing flank surface, and a thread slope on the side far from the pipe end is referred to as a load flank surface. In the female thread (box), a thread slope facing the stabbing flank surface of the pin is referred to as a stabbing flank surface, and a thread slope facing the load flank surface of the pin is referred to as a load flank surface.

As the thread processing method, any method such as a method by cutting or rolling in which the thread shape is transferred by plastic processing can be used. Cutting is preferable because better dimensional accuracy can be obtained and the surface layer of the inner and outer surfaces of the pipe is unlikely to be deformed.

FIG. 4 is a cross-sectional view of the threaded joint in the pipe axial direction (cross-sectional view parallel to the pipe axial direction). FIG. 4(a) is a cross-sectional view in the case where the threaded joint is an API threaded joint, and FIG. 4(b) is a cross-sectional view in the case where the threaded joint is a premium joint. In a threaded joint including only a thread such as an API threaded joint, maximum surface pressure is generated at both ends of the thread when the thread is fastened, the thread on the pin tip end side contacts on the stabbing flank surface, and the thread on the rear end side of the pin contacts on the load flank surface. In the case of a premium joint, it is necessary to consider the reaction force due to the torque shoulder portion, and when tightening the thread, the maximum surface pressure is generated on the load flank surfaces at both ends of the thread. In the case of the cold processing method, which is not the bending and bending back processing, the compressive yield strength in the pipe axial direction with respect to the tensile yield strength in the pipe axial direction is lowered due to the influence of the Bauschinger effect in the pipe axial direction, and compressive stress is generated in the stress concentration portion. Since the compressive yield strength is low, micro-deformation occurs, and when a fastening method at the thread is adopted, the fatigue life of the thread is shortened. On the other hand, by utilizing the bending and bending back processing according to the present embodiment and setting the radius of curvature of the corner portion R to 0.2 mm or more, the fatigue characteristics of the thread in the seamless pipe are improved and good pressure resistance performance is obtained.

Increasing the radius of curvature of the corner portion R to 0.2 mm or more is effective in further relaxing stress concentration. However, the large corner portion R deprives the thread of design freedom, which may limit the size of the pipe that can be threaded or cause the design impossible. In addition, when the corner portion R is increased, the area of the flank surface of the male thread and the female thread that come into contact with each other is reduced, so that the sealing property and the fastening force may be lowered. Therefore, it is more preferable that the corner portion R is in the range of 0.2 to 3.0 mm. Alternatively, it is appropriate to define the area of the flank surface that decreases with the size of the corner portion R in relation to the thread height. Regarding the radius of curvature of the above corner portion R, it is preferable that the radius of curvature is such that the corner portion R occupies a radial length of less than 20% of the height of the thread (length in the radial direction from the center side of the pipe axis), and the radius of curvature of the corner portion R is designed to be 0.2 mm or more.

The premium joint illustrated in FIG. 4(b) includes not only a thread but also a metal-to-metal seal portion and a torque shoulder portion. The premium joint is fastened by the metal-to-metal seal portion (Seal in FIG. 4(b)) to ensure the tightness of the pipe. On the other hand, although the torque shoulder portion (Shoulder in FIG. 4(b)) acts as a stopper during tightening and plays an important role in ensuring a stable tightening position, a high compressive stress is generated during tightening. When the torque shoulder portion is deformed due to high compressive stress, the tightness is impaired. In addition, the inner diameter is reduced due to the deformation toward the inner diameter side. Therefore, it is necessary to increase the wall thickness to improve the compression strength so that the torque shoulder portion is not deformed, and it is impossible to design a thin-walled pipe. In addition, the material is wasted due to the excess wall thickness.

Furthermore, normally, in a case of tightening a thread, a tightening torque value (value of the torque while tightening the thread) is confirmed. The sealed torque value (which means the torque value during tightening because the torque value indicates the sealed state when a certain standard is exceeded by tightening) and, as the upper limit, the torque value at which the torque shoulder portion is not deformed (torque value does not exceed this standard, because when the torque value exceeds a certain standard, the thread tip end is deformed) are managed. That is, the fastening is performed by managing the torque value within the range from the sealed torque value to the torque value at which the torque shoulder portion is not deformed.

At this time, in a case where the compressive yield strength of the pipe in the pipe axial direction is small, the upper limit of the torque value is reduced in order to suppress the deformation of the torque shoulder portion. Therefore, the control range of the torque value is narrow, and stable tightening is impossible.

FIG. 5 is a schematic view of a vicinity of a nose portion which is an extension portion of a pin. FIG. 5(a) is a cut sectional view of the pin and a coupling fastening portion parallel to the pipe axial direction, and FIG. 5(b) is a torque shoulder portion when a thread tip end portion of the pin is viewed from a front of a pin tip end portion.

In the present embodiment, when a pipe having a high compressive yield strength in the pipe axial direction is obtained by bending and bending back cold processing, deformation of the torque shoulder portion can be suppressed while maintaining high pressure resistance performance. In order to suppress deformation of the torque shoulder portion and perform stable tightening, the cross-sectional area of the tip end thickness (part that receives the tip end of the male thread on the coupling side, (Ds1-Ds0)/2), which is the torque shoulder portion of the male thread (pin) illustrated in FIG. 5 may be secured at 25% or more with respect to the cross-sectional area of the raw pipe. When the tip end thickness which is the torque shoulder portion of the male thread is increased, since the nose rigidity is too high and seizure is likely to occur during tightening, the preferable range is 25 to 60%.

In addition, by designing the nose portion so as to further increase the compression resistance of the torque shoulder portion, high torque performance (torque value that does not deform is increased so that a higher tightening torque can be applied) can be further realized, which is preferable. In order to realize high torque performance, as illustrated in FIG. 5(a), the ratio x/L to the nose length L, which is an unthreaded portion at the tip end of the pin, when the seal point position from the pipe end is x, is preferably 0.01 or more and 0.1 or less. By placing the seal point position near the shoulder portion, the substantial cross-sectional area of the shoulder portion (cross-sectional area of the shoulder portion: $\pi/4 \times (Ds1^2 - Ds0^2)$) increases and high torque performance can be obtained (refer to FIG. 5(b)). At this time, when the nose length L is too long, the nose rigidity is lowered and it cannot withstand a high compressive force, so that the nose length L is preferably 0.5 inch or less. On the other hand, when the nose length L is too short, there is no room for disposing the seal portion, so that it is desirable to set the nose length L to 0.2 inch or more.

In FIG. 5,

δ: Means the amount of seal interference, and is defined by the maximum value of the overlap allowance when the drawings are overlapped.

Ds1: Outer diameter of shoulder contact region

Ds0: Inner diameter of shoulder contact region

The sealing property indicating airtightness is also important as a characteristic of the thread, and it is preferable to satisfy the compression rate of 85% or more illustrated in the sealing test of ISO 13679: 2019, which can be realized by using the bending and bending back cold processing according to aspects of the present invention for increasing the strength. In order to achieve high sealing property, the nose length L, which is the unthreaded portion at the tip end of the pin, is 0.3 inch or more, and the ratio x/L to the nose length L when the seal point position from the pipe end is x, is preferably 0.2 or more and 0.5 or less. However, when the nose length is increased than necessary, it takes time to cut, the nose rigidity is lowered, and the performance is unstable. Therefore, it is desirable that the nose length L is 1.0 inch or less.

EXAMPLES

Example 1

Hereinafter, aspects of the present invention will be described based on examples.

The pressure resistance performance of various materials was evaluated. First, Table 1 illustrates the standards of the test materials.

TABLE 1

| Material No. | Material name | Standard |
|---|---|---|
| A | Duplex stainless steel | UNS S32205 |
| B | | UNS S32760 |
| C | Carbon steel | JIS S35C |
| D | Ni-based alloy | UNS N06600 |

This material was subjected to hot piercing rolling (Ugine-Sejournet method, Erhardt push bench method, or Mannesmann method) illustrated in Table 2 to produce a seamless pipe having an average outer diameter of 045 to 460 mm. In hot rolling, the material was heated in a heating furnace at 1300° C., and thereafter each hot piercing rolling was followed by wall thinning and sizing rolling, and thereafter air cooling was performed to obtain a product shape. Regarding the material A, the air-cooled pipe was used as it was. Regarding the materials B, C, and D, heat-treatment was performed by heating the air-cooled pipe to 1000 to 1150° C. and performing water quenching. Regarding the pipe subjected to hot piercing rolling by the Mannesmann method, relating to the pipe length LF [mm] after hot rolling, the pipe length LP [mm] after piercing rolling, and the amount of traveling X [mm] in the rolling direction in one rotation of the pipe during piercing rolling, "(LF/LP)×X" was controlled to the value illustrated in Table 2.

In addition, various types of cold rolling were partially performed (refer to cold drawing (cold drawing processing) and bending and bending back (bending and bending back processing in the pipe circumferential direction) in Table 2).

Regarding the cold drawing, a 15% wall thinning was given when finishing to product dimensions. The bending and bending back processing was performed by rotating the roll that have a rotation axis tilted 2 to 5° with respect to the pipe axial direction and are disposed at 120° intervals in the pipe circumferential direction to pull in the pipe and applying bending and bending back deformation. The pipe passing through the roll having the roll gap reduced by 5 to 15% with respect to the initial outer diameter of the pipe was bent and bent back.

Regarding the manufactured seamless pipe, the yield strength characteristics in the pipe axial direction (pipe axis tensile yield strength in the pipe axial direction (pipe axial tensile yield strength), and compressive yield strength in the pipe axial direction (pipe axial compressive yield strength)) and the inclination angle α were measured.

The inclination angle α is an inclination angle with respect to the pipe axial direction of a line segment formed by connecting one end and the other end of the thin-walled portion along the pipe surface with the shortest distance in the formation direction of the thin-walled portion. In addition, regarding the setting positions of one end and the other end, one end and the other end of the thin-walled portion were set from the region in the pipe selected with a shorter length between (1) the length of 1.0 m in the pipe axial direction and (2) 90% of the length in the pipe axial direction where the thin-walled portion turns once in the pipe circumferential direction. Regarding the inclination angle α measured for each pipe, it was confirmed that the same value can be obtained even in a case where one end and the other end of the thin-walled portion are set from the region in the pipe selected at 40% of the length in the pipe axial direction where the thin-walled portion turns once in the pipe circumferential direction.

In addition, the inclination angle α was measured with the central portion in the length direction of the pipe as the center in the length direction of the measurement target region.

The above inclination angle α was calculated by measuring the wall thickness distribution by ultrasonic waves in the state of the product length, and based on the maximum wall thickness $t_{max}$ [mm], the minimum wall thickness $t_{min}$ [MM] the average wall thickness $t_{ave}$ [mm] for the entire pipe, and the uneven wall thickness distribution at the time of piercing rolling by the Fourier transform using the distribution thereof. The average wall thickness $t_{ave}$ is obtained by measuring 32 points of the wall thickness t at intervals of 11.25° in the pipe circumferential direction starting from the thin-walled portion in the central portion in the length direction of the pipe and calculating the average of these numbers.

For the compressive yield strength in the pipe axial direction and the tensile yield strength in the pipe axial direction, a round bar tensile test piece and a cylinder compression test piece having an outer diameter (diameter) of 5.0 mm were cut out from the center portion of the wall thickness at the end portion of the pipe used for the pressure resistance test, and tested at compression and tension speed of 1.0 mm/min, respectively, and stress-strain curves were measured by normal temperature tension and compression tests. The tensile yield strength in the pipe axial direction and the compressive yield strength in the pipe axial direction were calculated from this stress-strain curve.

Specifically, first, the compressive yield strength in the pipe axial direction was measured by the cylindrical compression test. The cylindrical test piece to be compressed was collected from the center portion of the wall thickness parallel to the pipe axial direction. The test piece was cut out from the center portion of the wall thickness of the pipe with a cylinder outer diameter d=5.0 mm and a cylinder height h=8.0 mm. The compression test adopted a form in which a test piece was sandwiched between flat plates at room temperature (25° C.) to be applied a load, and the compressive yield strength was calculated using the stress-strain curve obtained when the test piece was compressed. The stress-strain curve was obtained by performing 30% compression at a compression speed (=crosshead speed) of 1.0 mm/min with a compression tester.

In addition, the tensile yield strength in the pipe axial direction was in accordance with JIS Z2241. First, as a test piece, a round bar tensile test piece having a parallel portion diameter of 5.0 mm was cut out from the center portion of the wall thickness of the pipe parallel to the pipe axial direction. A tensile test was performed at room temperature (25° C.) at a crosshead speed of 1.0 mm/min until fracture. The tensile yield strength was calculated using the stress-strain curve obtained as a result.

The evaluation was performed by giving various inclination angles α to the seamless pipes with the same amount of uneven wall thickness, $t_{min}$, outer diameter, and tensile yield strength in the pipe axial direction as the test material, performing a pressure resistance test on each of the pipes, and performing a relative evaluation in a case where a comparative example in which the inclination angle α was less than 5.0° was set to 100.

The above pressure resistance test was performed by closing the pipe end portion of the obtained pipe, inserting the pipe into a case having an inner diameter larger than the outer diameter of the pipe, sealing the pipe, and applying water pressure to the inside or outside of the pipe. In the pressure resistance test conditions a and b, the external pressure or the internal pressure was increased by 1 MPa from 0 MPa to 150 MPa, respectively, and the pressure at the point where the fluctuation of the water pressure was observed due to the collapse of the pipe was defined as a collapse strength (pressure resistance performance). The method of applying the external or internal pressures for c and d is the same as that for a and b, respectively, and the method was performed while applying a constant bending moment to the pipe. The bending moment was applied so that the axial tensile stress on the outer surface of the pipe was constant at 80% with respect to the axial tensile yield strength of the pipe obtained by the tensile test. The collapse strength (pressure resistance performance) was determined by the pressure at the point where the fluctuation of the water pressure was confirmed, similarly to the conditions a and b.

The average outer diameter $D_{ave}$ was obtained by measuring 9 points of the outer diameter D at intervals of 40° in the pipe circumferential direction starting from the thin-walled portion and calculating the number average of these 9 points.

In addition, the amount of uneven wall thickness is represented by the following formula (3) using the maximum wall thickness $t_{max}$ [mm], the minimum wall thickness $t_{min}$ [mm], and the average wall thickness $t_{ave}$ [mm] for the wall thickness distribution generated by piercing rolling.

Amount of uneven wall thickness=$((t_{max}-t_{min})/t_{ave}) \times 100$ [%] .... Formula (3)

From the results in Table 2, it was found that all of the examples of the present invention were excellent in pressure resistance performance. Furthermore, the one in which the bending and bending back processing is applied to the cold processing has excellent strength characteristics in the pipe axial direction, and exhibits good pressure resistance performance even in the pressure resistance test in which axial compressive stress is generated.

TABLE 2

| Pipe No. | Material | Hot piercing rolling method | Cold rolling method | (LF/LP) × X mm | Average outer diameter $D_{ave}$ mm | Amount of uneven wall thickness % | Inclination angle α ° | $D_{ave}/\alpha$ mm/° |
|---|---|---|---|---|---|---|---|---|
| 1 | A | Erhardt push bench method | Cold drawing | — | 460 | 11 | <u>1.5</u> | 306.7 |
| 2 | A | Erhardt push bench method | Cold drawing | — | 460 | 11 | <u>1.5</u> | 306.7 |
| 3 | A | Ugine-Sejournet method | Cold drawing | — | 77 | 8 | <u>1.5</u> | 51.3 |
| 4 | A | Ugine-Sejournet method | Cold drawing | — | 77 | 8 | <u>1.5</u> | 51.3 |
| 5 | A | Mannesmann method | Bending and bending back | 990 | 77 | 8 | 15.0 | 5.1 |
| 6 | A | Mannesmann method | Bending and bending back | 500 | 77 | 8 | 23.0 | 3.3 |
| 7 | A | Mannesmann method | Bending and bending back | 300 | 77 | 8 | 85.0 | 0.9 |
| 8 | A | Mannesmann method | Bending and bending back | 300 | 460 | 11 | 79.0 | 5.8 |
| 9 | A | Mannesmann method | Bending and bending back | 150 | 460 | 11 | 85.0 | 5.4 |
| 10 | B | Ugine-Sejournet method | Cold drawing | — | 120 | 8 | <u>1.0</u> | 120.0 |
| 11 | B | Ugine-Sejournet method | Cold drawing | — | 120 | 8 | <u>1.0</u> | 120.0 |
| 12 | B | Ugine-Sejournet method | Cold drawing | — | 120 | 8 | <u>1.0</u> | 120.0 |
| 13 | B | Mannesmann method | Bending and bending back | 800 | 120 | 8 | 35.0 | 3.4 |
| 14 | B | Mannesmann method | Bending and bending back | 700 | 120 | 8 | 39.0 | 3.1 |
| 15 | B | Mannesmann method | Bending and bending back | 350 | 120 | 8 | 52.0 | 2.3 |
| 16 | C | Ugine-Sejournet method | Cold drawing | — | 45 | 15 | <u>4.0</u> | 11.3 |
| 17 | C | Mannesmann method | Bending and bending back | 300 | 45 | 15 | 15.0 | 3.0 |
| 18 | C | Ugine-Sejournet method | — | — | 55 | 13 | <u>3.5</u> | 15.7 |
| 19 | D | Ugine-Sejournet method | — | — | 220 | 7 | <u>2.5</u> | 88.0 |
| 20 | D | Ugine-Sejournet method | Cold drawing | — | 180 | 9 | <u>4.5</u> | 40.0 |
| 21 | D | Mannesmann method | Bending and bending back | 400 | 180 | 9 | 75.0 | 2.4 |
| 22 | A | Mannesmann method | Bending and bending back | 1050 | 77 | 8 | 6.5 | 11.8 |
| 23 | A | Mannesmann method | Bending and bending back | 1090 | 77 | 8 | 5.5 | 14.0 |
| 24 | B | Mannesmann method | Bending and bending back | 1010 | 120 | 8 | 7.5 | 16.0 |
| 25 | C | Mannesmann method | Bending and bending back | 80 | 45 | 15 | 83.0 | 0.5 |
| 26 | D | Mannesmann method | Bending and bending back | 1080 | 180 | 9 | 13.0 | 13.8 |
| 27 | A | Mannesmann method | Cold drawing | 1180 | 89 | 6 | <u>3.0</u> | 29.7 |
| 28 | A | Mannesmann method | Bending and bending back | 950 | 89 | 6 | 11.0 | 8.1 |
| 29 | B | Mannesmann method | Cold drawing | 1450 | 245 | 7 | <u>4.5</u> | 54.4 |
| 30 | B | Mannesmann method | Bending and bending back | 1050 | 245 | 7 | 5.5 | 44.5 |
| 31 | B | Mannesmann method | Bending and bending back | 450 | 245 | 7 | 14.0 | 17.5 |
| 32 | D | Ugine-Sejournet method | Cold drawing | — | 89 | 8 | <u>1.0</u> | 89.0 |
| 33 | D | Mannesmann method | Bending and bending back | 450 | 89 | 8 | 16.0 | 5.6 |

TABLE 2-continued

| Pipe No. | Pipe axial tensile yield strength MPa | Pipe axial compressive yield strength MPa | Pipe axial compressive yield strength/pipe axial tensile yield strength | Pressure resistance test conditions a-d | Relative comparison No. | Pressure resistance performance (Compare with comparative example) | Remarks |
|---|---|---|---|---|---|---|---|
| 1 | 895 | 730 | 0.82 | a | — | 100 | Comparative example |
| 2 | 895 | 730 | 0.82 | c | — | 100 | Comparative example |
| 3 | 890 | 725 | 0.81 | a | — | 100 | Comparative example |
| 4 | 890 | 725 | 0.81 | c | — | 100 | Comparative example |
| 5 | 890 | 910 | 1.02 | a | Compare with No. 3 | 103 | Example of invention |
| 6 | 890 | 910 | 1.02 | c | Compare with No. 4 | 110 | Example of invention |
| 7 | 890 | 910 | 1.02 | c | Compare with No. 4 | 115 | Example of invention |
| 8 | 895 | 920 | 1.03 | a | Compare with No. 1 | 109 | Example of invention |
| 9 | 895 | 920 | 1.03 | c | Compare with No. 2 | 112 | Example of invention |
| 10 | 912 | 735 | 0.81 | a | — | 100 | Comparative example |
| 11 | 912 | 735 | 0.81 | b | — | 100 | Comparative example |
| 12 | 912 | 735 | 0.81 | c | — | 100 | Comparative example |
| 13 | 912 | 925 | 1.01 | a | Compare with No. 10 | 109 | Example of invention |
| 14 | 912 | 925 | 1.01 | b | Compare with No. 11 | 118 | Example of invention |
| 15 | 912 | 925 | 1.01 | c | Compare with No. 12 | 108 | Example of invention |
| 16 | 385 | 325 | 0.84 | d | — | 100 | Comparative example |
| 17 | 385 | 400 | 1.04 | d | Compare with No. 16 | 112 | Example of invention |
| 18 | 275 | 275 | 1.00 | d | — | 100 | Comparative example |
| 19 | 250 | 255 | 1.02 | a | — | 100 | Comparative example |
| 20 | 895 | 750 | 0.84 | b | — | 100 | Comparative example |
| 21 | 895 | 925 | 1.03 | b | Compare with No. 20 | 135 | Example of invention |
| 22 | 890 | 910 | 1.02 | c | Compare with No. 4 | 106 | Example of invention |
| 23 | 890 | 910 | 1.02 | a | Compare with No. 3 | 102 | Example of invention |
| 24 | 912 | 925 | 1.01 | c | Compare with No. 12 | 102 | Example of invention |
| 25 | 385 | 400 | 1.04 | d | Compare with No. 16 | 110 | Example of invention |
| 26 | 895 | 925 | 1.03 | b | Compare with No. 20 | 113 | Example of invention |
| 27 | 872 | 732 | 0.84 | a | — | 100 | Comparative example |
| 28 | 889 | 895 | 1.01 | a | Compare with No. 27 | 112 | Example of invention |
| 29 | 908 | 755 | 0.83 | c | — | 100 | Comparative example |
| 30 | 912 | 920 | 1.01 | c | Compare with No. 29 | 102 | Example of invention |

TABLE 2-continued

| 31 | 910 | 915 | 1.01 | c | Compare with No. 29 | 119 | Example of invention |
| 32 | 920 | 755 | 0.82 | d | — | 100 | Comparative example |
| 33 | 925 | 945 | 1.02 | d | Compare with No. 32 | 115 | Example of invention |

TABLE 3

| Condition No. | Load conditions |
|---|---|
| a | Only external pressure |
| b | Only internal pressure |
| c | External pressure and axial bending (simultaneous application of axial tensile compression) |
| d | Internal pressure and axial bending (simultaneous application of axial tensile compression) |

Example 2

Next, a portion of the pipes were provided with fastening portions for threaded joints and evaluated. A trapezoidal thread is formed at the end portion of the pipe by machining (refer to FIG. 3(a)), and after fastening the two pipes with the thread, a fatigue test was performed on the threads that were rotated with both pipe ends eccentricity of 3 to 10% according to the tensile yield strength in the pipe axial direction. Regarding the thread, the corner portion R, which is a stress concentration portion, was changed as illustrated in Table 4, and the number of rotations until the thread was broken due to the fatigue crack in the stress concentration portion and the growth of the fatigue crack was compared. In order to illustrate the effect of bending and bending back processing, which is a preferable manufacturing method and has better excellent thread characteristics, the evaluation of the number of rotations is expressed by the ratio when the steel type and size are the same and the number of rotations in other cold processing methods is 1, and the effect of extending the fatigue life was evaluated by judging that the pipe having a ratio larger than 1.00 was more excellent.

As illustrated in Table 4, regarding the materials A and B which are examples of the present invention, a threaded joint including a pin (pipe size) having an outer diameter of Φ88.9 mm and a wall thickness t of 6.5 mm and a corresponding coupling, and a threaded joint including a pin having an outer diameter of ϕ244.5 mm and a wall thickness t of 13.8 mm and a corresponding coupling were prepared. As the type of threaded joint, a joint including only threads and a premium joint including threads, a metal-to-metal seal portion, and a shoulder portion were prepared, and the above-described fatigue test was performed. Table 4 illustrates the radius of curvature of the corner portion R of the load flank and the stabbing flank of the thread bottom of the pin, and the radius of curvature of the corner portion R of the load flank and the stabbing flank of the thread bottom of the coupling.

TABLE 4

| Pipe No. | Material | Steel pipe size (pin) | Types of thread | Thread test No. | Radius of curvature of corner portion (mm) | | | | Fatigue test results | |
| | | | | | Load flank of pin | Stabbing flank of pin | Load flank of coupling | Stabbing flank of coupling | Relative comparison No. | Fatigue characteristics |
|---|---|---|---|---|---|---|---|---|---|---|
| 27 | A | Φ88.9 mm t6.5 mm | Only thread portion | A-1 | 0.2 | 0.2 | 0.2 | 0.2 | — | — |
| | | | | A-2 | 0.4 | 0.4 | 0.4 | 0.4 | — | — |
| | | | | A-3 | 0.6 | 0.6 | 0.6 | 0.6 | — | — |
| | | | | A-4 | 0.1 | 0.1 | 0.1 | 0.1 | A-1 | 0.78 |
| 28 | | | | A-5 | 0.2 | 0.2 | 0.2 | 0.2 | A-1 | 1.35 |
| | | | | A-6 | 0.4 | 0.4 | 0.4 | 0.4 | A-2 | 1.26 |
| | | | | A-7 | 0.6 | 0.6 | 0.6 | 0.6 | A-3 | 1.21 |
| 29 | B | Φ244.5 mm t13.8 mm | Premium joint | B-1 | 0.2 | 0.2 | 0.2 | 0.2 | — | — |
| | | | | B-2 | 0.4 | 0.4 | 0.4 | 0.4 | — | — |
| | | | | B-3 | 0.6 | 0.6 | 0.6 | 0.6 | — | — |
| | | | | B-4 | 0.1 | 0.1 | 0.1 | 0.1 | B-1 | 0.71 |
| 30 | | | | B-5 | 0.2 | 0.2 | 0.2 | 0.2 | B-1 | 1.35 |
| | | | | B-6 | 0.4 | 0.4 | 0.4 | 0.4 | B-2 | 1.28 |
| | | | | B-7 | 0.6 | 0.6 | 0.6 | 0.6 | B-3 | 1.24 |

From the results in Table 4, it was found that all of the seamless pipes according to aspects of the present invention were excellent in fatigue characteristics.

Next, in the premium joint, the design of the torque shoulder portion was evaluated. As illustrated in Table 5, a tightening test (Yield torque evaluation test) was performed on a threaded joint (premium joint) including a pin having an outer diameter of Φ88.9 mm and a wall thickness t of 6.5 mm and a corresponding coupling based on ISO 13679: 2019.

TABLE 5

| Pipe No. | Material | Thread test No. | Pipe size (pin) | Nose length L (inch) | x/L | Cross-sectional area ratio of shoulder portion | Thread test result Yield torque [N·m] |
|---|---|---|---|---|---|---|---|
| 27 | A | A-1 | Φ88.9 mm | 0.25 | 0.03 | 0.20 | 3000 |
|  |  | A-2 | t6.5 mm |  |  | 0.20 | 3000 |
|  |  | A-3 |  |  |  | 0.20 | 3000 |
| 28 |  | A-4 |  |  |  | 0.20 | 4000 |
|  |  | A-5 |  |  |  | 0.20 | 4000 |
|  |  | A-6 |  |  |  | 0.20 | 4000 |
| 32 | D | D-1 |  | 0.45 | 0.09 | 0.25 | 3000 |
|  |  | D-2 |  |  |  | 0.25 | 3000 |
|  |  | D-3 |  |  |  | 0.25 | 3000 |
| 33 |  | D-4 |  |  |  | 0.25 | 4500 |
|  |  | D-5 |  |  |  | 0.25 | 4500 |
|  |  | D-6 |  |  |  | 0.25 | 4500 |

When the cross-sectional area of the shoulder portion is 25% or less of the cross-sectional area of the unprocessed pin portion (cross-sectional area of the raw pipe) (when the cross-sectional area ratio of the shoulder portion is 0.25 or less), it was found that Yield was generated at a tightening torque (Yield torque) of 3000 N·m. Here, Yield refers to a state where a sufficiently large plastic deformation occurs in a threaded joint and the performance of the joint cannot be ensured. Since the Yield torque is high, the usable torque range is widened, and it can be said that the threaded joint is easy to use. In the results illustrated in Table 5, it cannot be said that there is sufficient Yield torque at 3000 Nm, and it can be said that the threaded joint has high performance at 4000 N·m.

In this respect, it was found that in the steel according to aspects of the present invention, even when the cross-sectional area of the shoulder portion is 20% of the cross-sectional area of the unprocessed pin portion, the Yield torque is 4000 N·m or more, and a sufficiently high torque can be secured and tightened.

Since this value is required to be 25% or more for the duplex stainless steel in the related art having low compression resistance, it was confirmed that the cross-sectional area of the shoulder portion in the duplex stainless steel according to aspects of the present invention is 20% or more of the cross-sectional area of the unprocessed pin portion, and the advantage that the same torque can be secured.

In addition, as a second high-performance threaded joint, realization of a threaded joint having a high sealing property that passes the sealing test of ISO 13679: 2019 can be described. Therefore, as illustrated in Table 6, a sealing test was performed based on ISO 13679: 2019 in a thread joint (premium joint) including a pin having an outer diameter of Φ88.9 mm and a wall thickness t of 6.5 mm and a corresponding coupling, and a threaded joint (premium joint) including a pin having an outer diameter of 0244.5 mm and a wall thickness t of 13.8 mm and a corresponding coupling.

TABLE 6

| Pipe No. | Material | Thread test No. | Pipe size (pin) | Nose length L (inch) | x/L | Sealing test Compression rate of sealing property (%) |
|---|---|---|---|---|---|---|
| 27 | A | A-1 | Φ88.9 mm | 0.35 | 0.25 | 78 |
|  |  | A-2 | t6.5 mm |  |  | 78 |
|  |  | A-3 |  |  |  | 78 |
| 28 |  | A-4 |  |  |  | 100 |
|  |  | A-5 |  |  |  | 100 |
|  |  | A-6 |  |  |  | 100 |
| 29 | B | B-1 | Φ244.5 mm | 0.90 | 0.45 | 84 |
|  |  | B-2 | t13.8 mm |  |  | 84 |
|  |  | B-3 |  |  |  | 84 |
| 30 |  | B-4 |  |  |  | 100 |
|  |  | B-5 |  |  |  | 100 |
|  |  | B-6 |  |  |  | 100 |

First, as described above, from the results in Table 5, it was found that it is possible to realize a threaded joint that can be tightened even with a lower shoulder cross-sectional area by applying the seamless pipe according to aspects of the present invention.

In addition, from the results in Table 6, the seamless pipe according to aspects of the present invention, which is excellent in the compressive yield strength in the pipe axial direction, passed with a seal compression rate of 85% or more, and excellent thread characteristics were obtained.

This feature can increase the degree of freedom in threaded joint design and enables the realization of the following two types of high performance threaded joints.

First, as a first high performance threaded joint, there is a high torque threaded joint that can secure sealing performance even when a high tightening torque is applied. High torque performance can be obtained by adopting a stainless seamless pipe having high compression resistance as in accordance with aspects of the present invention for a threaded joint. In addition, by optimizing the design of the threaded joint, it is possible to realize even higher torque. Specifically, the nose length L, which is the unthreaded portion at the tip end of the pin, is 0.2 inch or more and 0.5 inch or less, and the ratio x/L to the nose length L when the seal point position from the pipe end is x, is designed to be 0.01 or more and 0.1 or less.

In addition, from the result of the sealing test, in order to realize a highly airtight metal-to-metal seal portion, the nose length L, which is the unthreaded portion at the tip end of the pin, may be 0.3 inch or more and 1.0 inch or less, and the ratio x/L to the nose length L when the seal point position from the pipe end is x, may be 0.2 or more and 0.5 or less. When the nose length is increased and the seal point is separated from the pipe end as described above, there is a high possibility that the cross-sectional area of the shoulder portion is reduced, and the cross-sectional area of the material in the related art causes the problem of Yield to cause it impossible to design. This problem is remarkable with a thin wall, and it was impossible to achieve with a wall thickness of 6.5 mm or less.

In the seamless pipe according to aspects of the present invention, since the compression resistance is high, the problem of Yield can be avoided when the cross-sectional area of the shoulder portion can be secured at 20%, and it is possible to achieve to secure the cross-sectional area of the shoulder portion and to design with high sealing property. As illustrated in Table 6, it was confirmed that threads using the pipes No. 28 and 30 having compressive yield strength in the pipe axial direction/tensile yield strength in the pipe axial direction of 0.85 or more, passed the sealing test at a compression rate of 85% or more under a test load of ISO 13679: 2019. Specifically, it was confirmed that threads using the pipes No. 28 and 30 having compressive yield strength in the pipe axial direction/tensile yield strength in the pipe axial direction of 1.0 or more, passed the sealing test at a compression rate of 100%.

The invention claimed is:

1. A seamless pipe in which a thin-walled portion in a pipe circumferential direction is formed in a pipe axial direction, wherein
    a line segment formed by connecting one end and the other end of the thin-walled portion along a pipe surface with a shortest distance in a formation direction of the thin-walled portion is inclined at an angle α of 5.0° or more with respect to the pipe axial direction.

2. The seamless pipe according to claim 1, wherein one end and the other end of the thin-walled portion are set from a region in a pipe selected with a shorter length between a length of 1.0 m in the pipe axial direction and 90% of a length in the pipe axial direction where the thin-walled portion turns once in the pipe circumferential direction.

3. The seamless pipe according to claim 1, wherein an average outer diameter $D_{ave}$ [mm] and the angle α [°] satisfy the following formula (1);

$$D_{ave}/\alpha = 0.5 \text{ to } 15.0 [mm/°] \quad \quad \text{Formula (1).}$$

4. The seamless pipe according to claim 2, wherein an average outer diameter $D_{ave}$ [mm] and the angle α[°] satisfy the following formula (1);

$$D_{ave}/\alpha = 0.5 \text{ to } 15.0 [mm/°] \quad \quad \text{Formula (1).}$$

5. The seamless pipe according to claim 1, wherein compressive yield strength [MPa] in the pipe axial direction/tensile yield strength [MPa] in the pipe axial direction is 0.85 or more.

6. The seamless pipe according to claim 2, wherein compressive yield strength [MPa] in the pipe axial direction/tensile yield strength [MPa] in the pipe axial direction is 0.85 or more.

7. The seamless pipe according to claim 3, wherein compressive yield strength [MPa] in the pipe axial direction/tensile yield strength [MPa] in the pipe axial direction is 0.85 or more.

8. The seamless pipe according to claim 4, wherein compressive yield strength [MPa] in the pipe axial direction/tensile yield strength [MPa] in the pipe axial direction is 0.85 or more.

9. The seamless pipe according to claim 1, wherein at least one of pipe end portions on both sides is provided with a fastening portion of a male thread or a female thread and a radius of curvature of a corner portion formed by a flank surface and a bottom surface of a thread valley of the fastening portion is 0.2 mm or more.

10. The seamless pipe according to claim 3, wherein at least one of pipe end portions on both sides is provided with a fastening portion of a male thread or a female thread and a radius of curvature of a corner portion formed by a flank surface and a bottom surface of a thread valley of the fastening portion is 0.2 mm or more.

11. The seamless pipe according to claim 5, wherein at least one of pipe end portions on both sides is provided with a fastening portion of a male thread or a female thread and a radius of curvature of a corner portion formed by a flank surface and a bottom surface of a thread valley of the fastening portion is 0.2 mm or more.

12. The seamless pipe according to claim 9, wherein at least one of the pipe end portions on both sides is provided with the fastening portion of the male thread or the female thread, and the fastening portion is provided with a metal-to-metal seal portion and a torque shoulder portion.

13. The seamless pipe according to claim 10, wherein at least one of the pipe end portions on both sides is provided with the fastening portion of the male thread or the female thread, and the fastening portion is provided with a metal-to-metal seal portion and a torque shoulder portion.

14. The seamless pipe according to claim 11, wherein at least one of the pipe end portions on both sides is provided with the fastening portion of the male thread or the female thread, and the fastening portion is provided with a metal-to-metal seal portion and a torque shoulder portion.

15. A method for manufacturing the seamless pipe according to claim 1, the method comprising:
    performing piercing of a pipe material by hot rolling, while rotating the pipe material and advancing the pipe material in a pipe axial direction; and
    performing bending and bending back processing in a pipe circumferential direction as cold processing on a pipe after the hot rolling, wherein
    a pipe length LF [mm] after the hot rolling, a pipe length LP [mm] after the piercing rolling, and an amount of traveling X [mm] in a rolling direction of the pipe in one rotation of the pipe during the piercing rolling satisfy the following formula (2);

$$(LF/LP) \times X \leq 1100 [mm] \quad \quad \text{Formula (2).}$$

16. A method for manufacturing the seamless pipe according to claim 2, the method comprising:
    performing piercing of a pipe material by hot rolling, while rotating the pipe material and advancing the pipe material in a pipe axial direction; and performing bending and bending back processing in a pipe circumferential direction as cold processing on a pipe after the hot rolling, wherein a pipe length LF [mm] after the hot rolling, a pipe length LP [mm] after the piercing rolling, and an amount of traveling X [mm] in a rolling direction of the pipe in one rotation of the pipe during the piercing rolling satisfy the following formula (2);

$(LF/LP) \times X \leq 1100 [mm] \ldots$   Formula (2).

17. A method for manufacturing the seamless pipe according to claim 3, the method comprising:

performing piercing of a pipe material by hot rolling, while rotating the pipe material and advancing the pipe material in a pipe axial direction; and performing bending and bending back processing in a pipe circumferential direction as cold processing on a pipe after the hot rolling, wherein a pipe length LF [mm] after the hot rolling, a pipe length LP [mm] after the piercing rolling, and an amount of traveling X [mm] in a rolling direction of the pipe in one rotation of the pipe during the piercing rolling satisfy the following formula (2);

$(LF/LP) \times X \leq 1100 [mm] \ldots$   Formula (2).

18. A method for manufacturing the seamless pipe according to claim 4, the method comprising:

performing piercing of a pipe material by hot rolling, while rotating the pipe material and advancing the pipe material in a pipe axial direction; and performing bending and bending back processing in a pipe circumferential direction as cold processing on a pipe after the hot rolling, wherein a pipe length LF [mm] after the hot rolling, a pipe length LP [mm] after the piercing rolling, and an amount of traveling X [mm] in a rolling direction of the pipe in one rotation of the pipe during the piercing rolling satisfy the following formula (2);

$(LF/LP) \times X \leq 1100 [mm] \ldots$   Formula (2).

19. A method for manufacturing the seamless pipe according to claim 5, the method comprising:

performing piercing of a pipe material by hot rolling, while rotating the pipe material and advancing the pipe material in a pipe axial direction; and performing bending and bending back processing in a pipe circumferential direction as cold processing on a pipe after the hot rolling, wherein a pipe length LF [mm] after the hot rolling, a pipe length LP [mm] after the piercing rolling, and an amount of traveling X [mm] in a rolling direction of the pipe in one rotation of the pipe during the piercing rolling satisfy the following formula (2);

$(LF/LP) \times X \leq 1100 [mm] \ldots$   Formula (2).

20. A method for manufacturing the seamless pipe according to claim 7, the method comprising:

performing piercing of a pipe material by hot rolling, while rotating the pipe material and advancing the pipe material in a pipe axial direction; and performing bending and bending back processing in a pipe circumferential direction as cold processing on a pipe after the hot rolling, wherein a pipe length LF [mm] after the hot rolling, a pipe length LP [mm] after the piercing rolling, and an amount of traveling X [mm] in a rolling direction of the pipe in one rotation of the pipe during the piercing rolling satisfy the following formula (2);

$(LF/LP) \times X \leq 1100 [mm] \ldots$   Formula (2).

* * * * *